Patented Oct. 13, 1942

2,298,933

UNITED STATES PATENT OFFICE 2,298,933

METHOD OF TREATMENT OF PLANT TISSUE

Eduard Elion, Larchmont, N. Y.

No Drawing. Application January 18, 1941,
Serial No. 375,018

4 Claims. (Cl. 99—154)

This invention relates to a method for treating plant tissue and to the resulting product. It relates more specifically to the treatment of cut surfaces of fruits and vegetables adapted to undergo discoloration, so as to retard or inhibit the discoloration of the cut surfaces.

It is a well known fact that cut surfaces of many kinds of plant tissue when exposed to air or other media undergo more or less rapid discoloration, and thus are subject to undesired changes in their appearance. A common example of such discoloration is the brown color which develops rapidly on surfaces of apples and pears when exposed to air without the protection of the skin.

A common method of retarding the discoloration of cut surfaces of fruits is treatment with sulfurous acid. A preferred method is to expose the cut fruits to the fumes of burning sulphur. It is stated, however, that a sufficient effect with sulfur dioxide is obtained only if the fruit after drying still contains a substantial amount, say, at least 200 P. P. M. or 0.02% of sulfur dioxide. In another method, the sulfur dioxide is applied by rinsing the fruits in solutions that develop sulfur dioxide, such as solutions of sulfites and bisulfites. Such solutions should test at least 3,000 to 4,000 P. P. M. of sulfur dioxide equivalent. In order to retard the darkening of fruits, there has been proposed for example, immersing peeled fruit for 3 days in a 5% solution of sodium sulfite. Dipping in 1 to 3% solutions of bisulfite or metabisulfite has also been recommended.

It is obvious that the treatment of fruits or vegetables with fumes of burning sulfur is an inconvenient process requiring much time. Rinsing the fruits in solutions of chemicals which leave a relatively high concentration of the used chemicals on the fruits is also objectionable, from a physiological standpoint especially.

I have discovered that treating cut surfaces of fruits or vegetables with minute, harmless amounts of certain conveniently applied and inexpensive chemicals retards or prevents the discoloration of the cut surfaces.

The present invention comprises a method for the treatment of fruits, vegetables, and the like with minute amounts of a thiosulfate adapted to retard or inhibit the discoloration which occurs on the cut surfaces of such materials. The invention comprises also the treatment with a mixture of a thiosulfate and sufite. Furthermore, the invention includes fruits, vegetables, and the like treated by the method of the invention.

The thiosulfates that I have found to be particularly useful for the present purpose are thiosulfates of sodium, potassium, ammonium, calcium or a like metal that are at least appreciably soluble in water. These chemicals preferably are used in the form of very dilute solutions in water. No sulfur dioxide is present.

These concentrations are much lower than those required for the sulfite compounds mentioned above. Also the cost of my treatment is considerably lower than that of any known treatment to retard discoloration of cut surfaces of fruits or vegetables. The treatment according to my invention may replace sulfuring entirely, with the production of treated materials discoloring very little or not at all on exposure to air.

According to the invention, cut surfaces of fruits or vegetables, herein sometimes referred to as plant tissue, are treated with minute amounts of one or more thiosulfates. The plant tissue may be dipped, for instance, into very dilute aqueous solutions of the thiosulfate and then removed from the solution for subsequent drying. In other practices of the invention, the thiosulfate is applied in any convenient method, as by being sprayed in the form of a dilute aqueous solution or by being dusted upon the surfaces to be treated. There results a product in which the thiosulfate is impregnated into cut or exposed surfaces of the plant tissue.

Usually concentrations of from 0.05% to 0.5% of the thiosulfate solutions will give very satisfactory results and prevent any discoloration of the cut surfaces over long periods of time. Somewhat lower concentrations, such, for example, as 0.01% or so give excellent results in many cases, whereas somewhat higher concentrations are required in exceptional cases requiring severe treatment.

As an illustration of a preferred treatment, I immerse the plant tissue with freshly cut surface for about ½ to 1 minute in the thiosulfate solution, then remove the treated material from the solution, and subsequently dry the product. The drying is effected in any usual manner, as in air at either ordinary or a somewhat elevated temperature that is conventional in the drying of fruits or vegetables. No discoloration occurs during the drying.

In another practice of the invention, an apple was peeled and quartered. One quarter was untreated. It began turning brown immediately. A second quarter was immersed in a very dilute solution of sodium thiosulfate for about a minute, A third quarter was dipped likewise and then promptly rinsed thoroughly with water. The three quarters were then set aside in direct exposure to air and examined after three days. The first or untreated quarter was very brown. The second quarter had discolored very little and still had a greenish cast to its cream color. The third rinsed quarter had discolored only very slightly.

Just why a trace of thiosulfate remaining as a film over the cut surface of the product should be so effective and why the effectiveness is not largely removed by rinsing with water is not known.

In making dried fruit, the pieces in which the fruit is to be dried are immersed in the thiosulfate solution, the pieces removed from the solution, drained incompletely, and then dried under drying conditions that are usual for the industry. Dried peaches, apples, and the like so made are light in color.

The discoloration, in some cases, may be prevented sufficiently by dipping the material only momentarily in the thiosulfate solution. Satisfactory results have been obtained with various fruits by a treatment including dipping in the solution for approximately 1 minute or more and promptly rinsing the dipped fruit in water.

The preferred concentration of the thiosulfate solution to be used is approximately 0.05 to 0.5% but the exact concentration to be chosen varies somewhat with the nature of the products to be treated and the results to be obtained. Fruits or vegetables that darken very badly require a concentration of the thiosulfate solution that is relatively high, although actually very low, if substantially complete inhibition of discoloring is desired.

My treatment may be applied at any convenient time so long as the thiosulfate is present when the darkening normally occurs. The treatment may be combined with other known treatments for inhibiting the discoloration of cut surfaces of fruits and vegetables, although it preferably replaces entirely such other treatments.

Products that are treated particularly effectively in accordance with the invention include apples (such as McIntosh, winesap, red delicious, golden delicious, and other common varieties), pears, bananas, apricots, peaches, turnips, onions, mushrooms, and potatoes. With potatoes, however, the treated tissue which shows practically no discoloration in the wet state should not be dried in advance of use of the treated potatoes. Other plant tissues may be dried after the thiosulfate treatment without objectionable discoloration taking place.

As the thiosulfate, I prefer to use sodium thiosulfate. This chemical is inexpensive. In the concentrations used, it does not impart any objectionable taste or ordor to the product treated. In the minute amounts which remain on the treated tissues, it is entirely harmless for human consumption. As a matter of fact, the United States Dispensatory reports favorable results from the internal use of sodium thiosulfate in doses of 0.6 to 2 grams of sodium thiosulfate or even somewhat more.

In cases in which, after prolonged use of the thiosulfate solution, slight cloudiness or precipitation would occur, this is prevented by adding to the thiosulphate solution as initially made a very minor proportion of a sulfite such as the sulfite of sodium, potassium, or calcium, say, in the proportion of about 1 to 10% or so on the dry weight of the thiosulfate. The sulfite even in this very small proportion retards or entirely prevents any clouding or precipitation in the thiosulfate solution in contact with air and the cut surfaces of the fruit or vegetables. In the minute amount used, however, the sulfite itself is without any substantial inhibiting effect on the discoloration of the cut surfaces. The amount of sulfite to be used depends upon the amount of acid, which, although undesired, enters the thiosulfate solution in contact with the fruit or the like that is being treated. The sulfite used should be at least very slightly soluble in water.

In applying my invention it may be desirable to maintain a given concentration of the thiosulfate solution, by replacing from time to time any thiosulfate used, so that the solution may be used continuously at a practically constant concentration.

If, because of previous treatments such as peeling, the fruits or vegetables are covered with chemicals of a deleterious effect upon my process or which might be undesirable in other respects, these chemicals are first removed, as by rinsing with water, before the treatment according to my invention is made.

In this specification and in the appended claims the term "cut surfaces" of fruits and vegetables is intended to comprise all cases where the skin is substantially severed, abraded, pierced or otherwise removed, so that the flesh of the product becomes exposed to the surrounding media.

Proportions of sodium thiosulfate unless otherwise specifically stated are expressed herein as parts of the crystalline material.

It will be understood that the details given are for the purpose of illustration, not restriction, and that variations within the spirit of the invention are intended to be included within the scope of the appended claims.

I claim:

1. In the treatment of cut surfaces of fruit for inhibiting discoloration the method which comprises applying to the surface an aqueous thiosulfate solution that is substantially free from sulfur dioxide and that contains approximately 0.01 to 0.5% of thiosulfate and then draining away the solution so that only a small proportion of the solution remains on the surface of the fruit.

2. The method described in claim 1, the thiosulfate solution including a soluble sulfite in the proportion of approximately 1 to 10% of the weight of thiosulfate present and the sulfite serving the purpose of retarding precipitation in the thiosulfate solution.

3. The method described in claim 1, the product resulting from treating the cut surfaces with the thiosulfate solution and then draining away the solution being subjected to drying.

4. The method described in claim 1, including water washing of the cut surfaces after treatment with the thiosulfate solution and then drying the washed product.

EDUARD ELION.